United States Patent
Cheng et al.

(10) Patent No.: US 9,646,192 B2
(45) Date of Patent: May 9, 2017

(54) FINGERPRINT LOCALIZATION

(71) Applicant: Synaptics Inc., San Jose, CA (US)

(72) Inventors: Yi-Hsun E. Cheng, San Jose, CA (US);
Adam L. Schwartz, San Jose, CA (US); Kuntal Sengupta, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 104 days.

(21) Appl. No.: 14/675,635

(22) Filed: Mar. 31, 2015

(65) Prior Publication Data
US 2016/0292490 A1    Oct. 6, 2016

(51) Int. Cl.
*G06K 9/00* (2006.01)
*G06K 19/07* (2006.01)

(52) U.S. Cl.
CPC ....... *G06K 9/00033* (2013.01); *G06K 9/0002* (2013.01); *G06K 9/00013* (2013.01); *G06K 9/00026* (2013.01); *G06K 9/00087* (2013.01); *G06K 9/00926* (2013.01); *G06K 19/0718* (2013.01)

(58) Field of Classification Search
CPC ............. G06K 9/0002; G06K 9/00013; G06K 9/00026; G06K 9/00926; G06K 9/00087; G06K 19/0718
See application file for complete search history.

(56) References Cited

U.S. PATENT DOCUMENTS

| 5,337,369 | A | 8/1994 | Shibuya | |
|---|---|---|---|---|
| 5,572,597 | A | 11/1996 | Chang | |
| 8,693,736 | B2 * | 4/2014 | Benkley | G06K 9/00026 382/107 |
| 8,811,688 | B2 * | 8/2014 | Benkley | G06F 3/03547 382/124 |
| 2005/0152585 | A1 * | 7/2005 | Shatford | G06K 9/00087 382/124 |

(Continued)

FOREIGN PATENT DOCUMENTS

| EP | 0996925 B1 | 6/2002 |
|---|---|---|
| EP | 1183638 B1 | 12/2004 |

OTHER PUBLICATIONS

International Search Report and Written Opinion for Application No. PCT/US2016/024654, issued Jul. 29, 2016.

*Primary Examiner* — Utpal Shah
(74) *Attorney, Agent, or Firm* — Leydig, Voit & Mayer, LTD (57) ABSTRACT

A method, device and system for generating an enrollment template are provided. The enrollment template is generated by collecting a placement image representing a portion of a biometric object such as a fingerprint. The placement image is localized on the fingerprint by comparing the data in the placement image to data in a floor map representing a larger image of the fingerprint obtained by swiping or rolling the fingerprint over a sensing area of a partial placement sensor. As additional placement images are obtained more information is provided for the enrollment template. The additional placement images are also localized to one another utilizing the floor map. The enrollment template is generated based on a grouping of each placement image to its neighboring placement images.

23 Claims, 9 Drawing Sheets

(56) References Cited

U.S. PATENT DOCUMENTS

| | | | |
|---|---|---|---|
| 2005/0238212 A1 | 10/2005 | Du et al. | |
| 2006/0088195 A1* | 4/2006 | Tykowski | G06F 1/32 382/124 |
| 2006/0120578 A1* | 6/2006 | Shatford | G06K 9/00093 382/125 |
| 2008/0013805 A1* | 1/2008 | Sengupta | G06K 9/001 382/124 |
| 2008/0226132 A1* | 9/2008 | Gardner | G06K 9/00026 382/107 |
| 2013/0028488 A1* | 1/2013 | Abe | G06K 9/036 382/115 |

* cited by examiner

FINGERPRINT LOCALIZATION

FIELD OF THE DISCLOSURE

This invention generally relates to biometric recognition, and more particularly to fingerprint recognition.

BACKGROUND OF THE DISCLOSURE

Biometric authentication systems are used for authenticating users of devices incorporating the authentication systems. Biometric sensing technology provides a reliable, non-intrusive way to verify individual identity for authentication purposes.

Fingerprints, like certain other biometric characteristics, are based on unalterable personal characteristics and thus are a reliable mechanism to recognize individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, in particular portable applications, may require electronic fingerprint sensing systems that are compact, highly reliable, and inexpensive.

Fingerprint sensors are sometimes referred to as "swipe" sensors or "placement" sensors depending on their principle of operation. Typically, swipe sensors capture an image that is larger than the sensing area by capturing a series of scans of the fingerprint as the user swipes their finger over the sensing area. A processing system then reconstructs the scans into a larger swipe image. Since the image is reconstructed from a series of scans, this allows the sensing array to be made small, even as small as a single scan line, while still capturing a larger area image. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

As fingerprint sensors shrink in size, whether for the purpose of packaging them into smaller portable devices, to reduce cost, or for other reasons, accurate and usable fingerprint recognition becomes a challenging task. The fingerprint recognition system should capture a sufficient area of the fingerprint to discriminate between different users. It is possible for a swipe sensor to capture a much larger area of the fingerprint than the sensor size, allowing the fingerprint sensor to be made small while still capturing a larger area swipe fingerprint image with enough fingerprint information to easily discriminate between users. Unfortunately, some users find the process of swiping their finger over the sensor every time they want to access the system to be cumbersome.

Placement sensors provide an attractive solution for many users, since they allow the user to simply hold their finger over the sensor. However, there are several technical challenges with small placement sensors that only capture a partial fingerprint image. Because only a partial area of the fingerprint that corresponds to the size of the sensor is captured, the matching process should ideally be tailored to quickly and accurately match based on limited fingerprint information, a task for which conventional matching algorithms based on full fingerprint images are often poorly equipped. Furthermore, since the sensor is only large enough to capture a partial fingerprint image during placement, in ordinary use the user is likely to present different portions of the same fingerprint on different occasions when attempting to access the system. The recognition system should ideally be able to recognize the fingerprint without requiring the user to present the same small portion of the fingerprint every time.

To achieve this, an enrollment template is typically built up that is derived from several repeated placements of the fingerprint over the sensor. This process often still results in a low quality enrollment template, since the user is provided little guidance as to where to place the fingerprint, resulting in poor coverage of the fingerprint in the enrollment template. Furthermore, determining the geometric relationship between the separate placement views is a challenging task, particularly where multiple views are captured from non-overlapping portions of the fingerprint.

BRIEF SUMMARY OF THE DISCLOSURE

One embodiment provides an input device for generating an enrollment template. The input device includes a partial fingerprint sensor and a processing system. The processing system is coupled to the partial fingerprint sensor, and configured to obtain a swipe image of a user's fingerprint. The swipe image is captured while the user's fingerprint is moved over a sensing area of the partial fingerprint sensor. The processing system is further configured to generate a floor map of the user's fingerprint from the swipe image, where the floor map is larger than the sensing area of the partial fingerprint sensor. The processing system is further configured to obtain a placement image of the user's fingerprint, where the placement image is captured while the user's fingerprint is held over the sensing area of the partial fingerprint sensor. And the processing system is further configured to localize the placement image of the user's fingerprint based on the floor map.

Another embodiment includes a method of constructing an enrollment template containing images obtained from a partial fingerprint sensor of an input device. The method includes obtaining a swipe image of a user's fingerprint, where the swipe image is captured while the user's fingerprint is moved over a sensing area of the partial fingerprint sensor. The method further includes generating a floor map of the user's fingerprint from the swipe image, where the floor map is larger than the sensing area of the partial fingerprint sensor. The method further includes obtaining a placement image of the user's fingerprint, where the placement image is captured while the user's fingerprint is held over the sensing area of the partial fingerprint sensor. And the method further includes localizing the placement image of the user's fingerprint based on the floor map.

Yet another embodiment includes an electronic system for constructing an enrollment template containing images obtained from a partial fingerprint sensor of the electronic system. The electronic system includes a processing system configured to obtain a swipe image of a user's fingerprint, where the swipe image is captured while the user's fingerprint is moved over a sensing area of the partial fingerprint sensor. The processing system is further configured to generate a floor map of the user's fingerprint from the swipe image, where the floor map is larger than the sensing area of the partial fingerprint sensor. The processing system is further configured to obtain a placement image of the user's fingerprint, where the placement image is captured while the user's fingerprint is held over the sensing area of the partial fingerprint sensor. And the processing system is further configured to localize the placement image of the user's fingerprint based on the floor map.

BRIEF DESCRIPTION OF THE DRAWING(S)

The accompanying drawings incorporated in and forming a part of the specification illustrate several aspects of the present disclosure and, together with the description, serve to explain the principles of the disclosure. In the drawings:

FIG. 2b is an enhanced image of the fingerprint of FIG. 2a;

FIG. 4b is a thin-ridge version of the fingerprint of FIG. 4a;

While the disclosure will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION OF THE DISCLOSURE

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present disclosure provide input devices and methods that facilitate improved usability.

Figure 1:
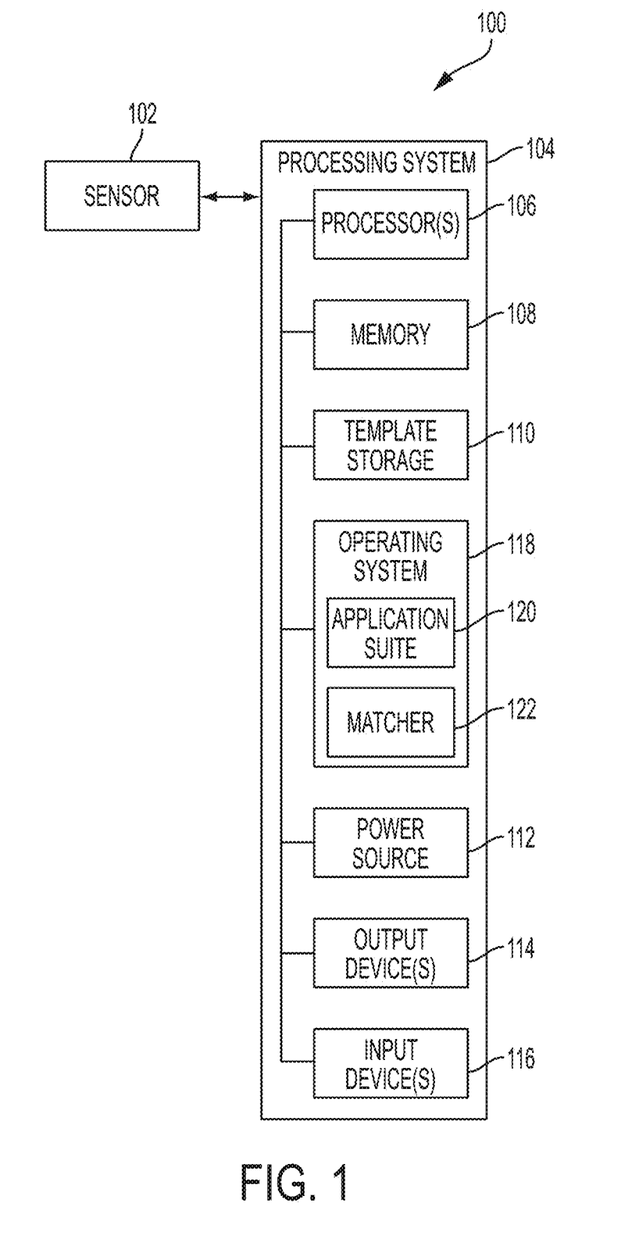
FIG. 1 is a block diagram of an exemplary device that includes an input device and processing system, in accordance with an embodiment of the disclosure.

Turning now to the figures, FIG. 1 is a block diagram of an electronic system or device 100 that includes an input device such as sensor 102 and processing system 104, in accordance with an embodiment of the disclosure. As used in this document, the term "input device" and "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor 102.

Sensor 102 can be implemented as a physical part of the electronic device 100, or can be physically separate from the electronic device 100. As appropriate, the sensor 102 may communicate with parts of the electronic device 100 using any one or more of the following: buses, networks, and other wired or wireless interconnections. Examples include $I^2C$, SPI, PS/2, Universal Serial Bus (USB), Bluetooth, RF, and IRDA.

Generally, sensor 102 will be utilized as a fingerprint sensor utilizing one or more various electronic fingerprint sensing methods, techniques and devices to capture a fingerprint image of a user. Generally, fingerprint sensor 102 may utilize any type of technology to capture a user's fingerprint. For example, in certain embodiments, the fingerprint sensor 102 may be an optical, capacitive, thermal, pressure, radio frequency (RF) or ultrasonic sensor.

In some embodiments, the sensor 102 is a capacitive fingerprint sensor, with the traces that form a 2D grid array, e.g., with rows of transmitter/receiver traces on one substrate and columns of receiver/transmitter traces on the same or a separate substrate, e.g., laminated together with some form of dielectric between the traces to form a 2D sensor element array.

Furthermore, biometric image sensors, such as fingerprint sensors, are sometimes referred to as "swipe" sensors or "placement" sensors depending on their principle of operation. Typically, swipe sensors capture an image that is larger than the sensing area by capturing a series of scans of the fingerprint as the user swipes their finger over the sensing area. A processing system then reconstructs the scans into a larger swipe image. Since the image is reconstructed from a series of scans, this allows the sensing array to be made small, even as small as a single scan line, while still capturing a larger area image. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

Placement sensors have an active sensing surface or in other terms, sensing area, that is large enough to accommodate a portion of the relevant part of the fingerprint of the finger during a single scan or sensing action. Where the relevant part of the fingerprint is less than the full fingerprint, this is referred to herein as a "partial" fingerprint sensor. Partial fingerprint placement sensors can be made very small and still reliably recognize fingerprints with sophisticated matching schemes, but typically matching performance is affected by the quality of the enrollment template being matched against. In one embodiment of this disclosure, a partial fingerprint sensor is used with a sensing area less than approximately 50 square mm. In another embodiment, a partial fingerprint sensor is used with a sensing area less than approximately 30 square mm. Typically, for placement sensors, the finger is held stationary over the sensing area during a measurement. During a fingerprint enrollment process, multiple views of the fingerprint image may be captured.

Generally, swipe sensors can be made smaller in size than placement sensors that capture an equivalent fingerprint area, and require the finger to be moved over the sensor during a measurement. Typically, the finger movement will be either 1D in that the finger moves in a single direction over the sensor surface, or the finger movement can be 2D in that the finger can move in more than one direction over the sensor surface during a measurement. In certain embodiments of this disclosure, a placement sensor may be operated in a swipe mode. In these embodiments, a placement sensor may capture a swipe image by capturing a series of scans during relative motion between the sensor array and the user's fingerprint, and the series of scans are reconstructed into a larger area swipe image. In one implementation, the placement sensor captures the scans using its entire sensor array. In another implementation, the placement sensor looks to only a subset of pixels in its sensor array, such as one or two scan lines, when capturing the swipe image.

Turning now to the processing system 104 from FIG. 1, basic functional components of the electronic device 100 utilized during capturing and storing a user fingerprint image are illustrated. The processing system 104 includes a processor 106, a memory 108, a template storage 110, a power source 112, an output device(s) 114, an input device(s) 116 and an operating system (OS) 118 hosting an application suite 120 and a matcher 122. Each of the processor 106, the memory 108, the template storage 110, the power source 112, the output device(s) 114, the input device(s) 116 and the operating system 118 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 includes one or more power sources 112 to provide power to the electronic device 100. Non-limiting examples of power source 112 include single-use power sources, rechargeable power sources, and/or power sources developed from nickel-cadmium, lithium-ion, or other suitable material.

The processing system 104 includes one or more input devices 116. Input devices 116 are configured to receive input from a user or a surrounding environment of the user through tactile, audio, and/or video feedback. Non-limiting examples of input device 116 include a presence-sensitive screen, a mouse, a keyboard, a voice responsive system, video camera, microphone or any other type of input device. In some examples, a presence-sensitive screen includes a touch-sensitive screen. In certain embodiments, the sensor 102 may be included as an input device 116.

One or more output devices 114 are also included in processing system 104. Output devices 114 are configured to provide output to a user using tactile, audio, and/or video stimuli. Output device 114 may include a display screen (part of the presence-sensitive screen), a sound card, a video graphics adapter card, or any other type of device for converting a signal into an appropriate form understandable to humans or machines. Additional examples of output device 114 include a speaker such as headphones, a cathode ray tube (CRT) monitor, a liquid crystal display (LCD), or any other type of device that can generate intelligible output to a user.

The processing system 104 also hosts an operating system 118. The operating system 118 controls operations of the components of the processing system 104. For example, the operating system 118 facilitates the interaction of the processor(s) 106, memory 108, template storage 110, power source 112, output devices 114 and input devices 116. The operating system 118 further hosts the application suite 120. The application suite 120 contains applications utilizing data stored on the memory 108 or the template storage 110 or data collected from input devices 112 or the sensor 102 to cause the processing system 104 to perform certain functions. For instance, in certain embodiments, the application suite 120 hosts an enroller application, which functions to capture one or more views of the user's fingerprint. The views or fingerprint images generally contain a partial or full image of the user's fingerprint. The enrollment application generally instructs the user to hold or swipe their finger across the sensor 102 for capturing the image. After each requested image is captured, the enrollment application typically stores the captured image in the template storage 110. In certain embodiments, the enrollment application will cause the data representing the captured image to undergo further processing. For instance, the further processing may be to compress the data representing the captured image such that it does not take as much memory within the template storage 110 to store the image.

In certain embodiments, the application suite 120 will also contain applications for authenticating a user of the electronic device 100. For example, these applications may be an OS logon authentication application, a screen saver authentication application, a folder/file lock authentication application, an application lock and a password vault application. In each of these applications, the individual application will cause the operating system 118 to request the user's fingerprint for an authentication process prior to undertaking a specific action, such as providing access to the OS 118 during a logon process for the electronic device 100. To perform this process, the above listed applications will utilize the matcher 122 hosted by the operating system 118.

Figure 2A:
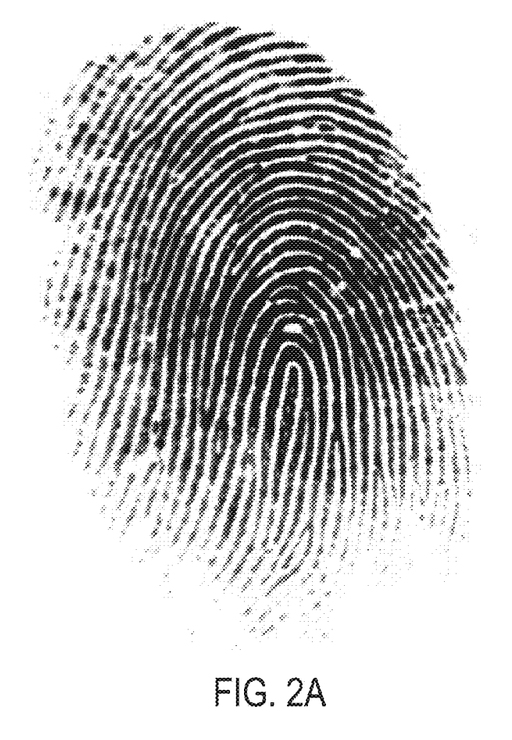
FIG. 2a is an image of a fingerprint.
Figure 2B:
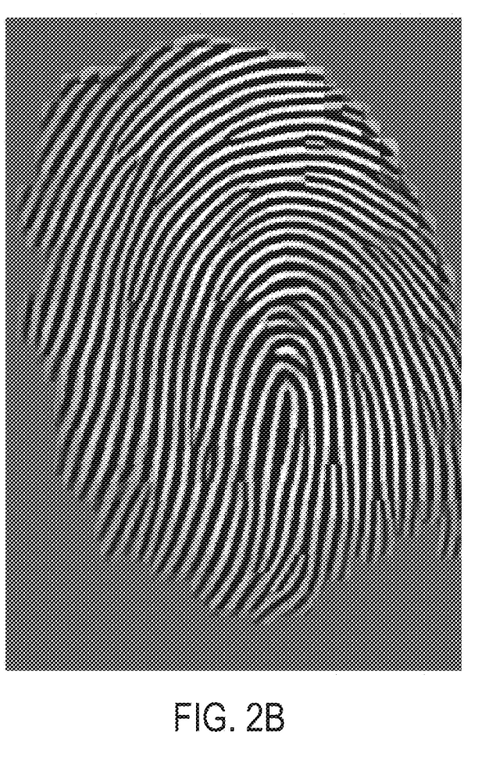

The matcher 122 of the operating system 118 functions to compare the fingerprint image or images stored in the template storage 110 with a newly acquired fingerprint image or images from a user attempting to access the electronic device 100. In some embodiments, the matcher 122 will also function to compare fingerprint images collected during the enrollment process such that the collected fingerprint images may be grouped to form the enrollment template. In certain embodiments, the matcher 122 will further perform image enhancement functions for enhancing a fingerprint image. An example of the image enhancement function is illustrated in FIGS. 2a and 2b. FIG. 2a illustrates an unenhanced fingerprint image that shows various ridges and minutia of a fingerprint. As can be seen in FIG. 2a, the image is noisy such that portions of the image are cloudy and the ridges or contours are broken. FIG. 2b illustrates the same fingerprint after the matcher 122 has performed the image enhancement function. As can be seen, the image enhancement function removes much of the noise such that the image is no longer cloudy and the ridges are no longer broken.

Figure 3:
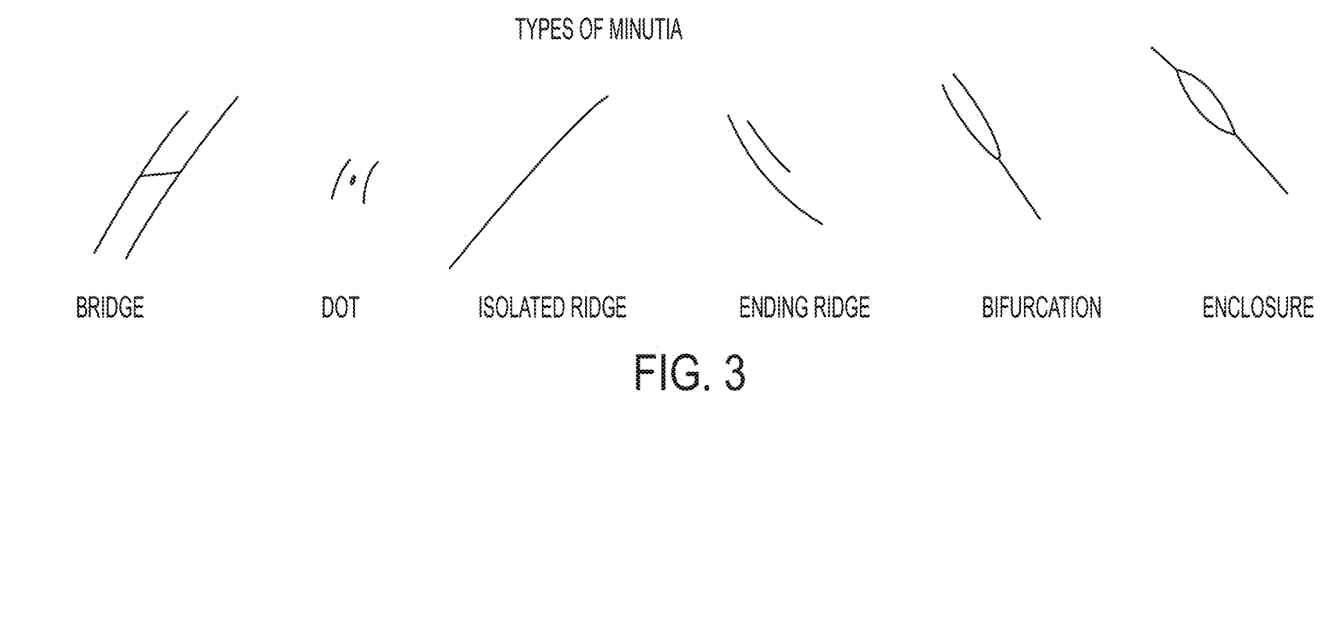
FIG. 3 is an illustration of various types of minutiae points of a fingerprint.

In certain embodiments, the matcher 122 is also configured to perform feature extraction from the fingerprint image or images of the user. During feature extraction, the matcher 122 will extract unique features of the user's fingerprint to utilize during authentication. In the context of fingerprint recognition, there are a variety of approaches to matching fingerprint images, which include minutia matching and pattern matching schemes. If recognition is performed using minutia matching, the matcher 122 will scan the captured view of the user's fingerprint for minutia. FIG. 3 illustrates various types of fingerprint minutia, including a bridge point between two or more ridges, a dot, an isolated ridge, an ending ridge, a bifurcation point and an enclosure. During extraction, the matcher 122 acquires a location and orientation of the minutia from the fingerprint and compares it to previously captured location and orientation information of minutia from the fingerprint image or images in the template storage 110. If certain threshold criteria are met, then the matcher 122 indicates a match, otherwise, no match is indicated.

Alternatively, the matcher 122 may be configured to perform pattern matching. Whereas minutia matching typically needs only the minutia points, with their respective locations and orientations, pattern matching utilizes a more complete representation of the fingerprint. Examples of pattern matching include ridge matching, which compares skeletonized representations of fingerprint contours to each other, and ridge flow matching, which compares contour orientation information to perform matching. If certain threshold criteria are met, then the matcher 122 indicates a match, otherwise, no match is indicated.

Regardless of whether minutia matching or pattern matching is utilized by the matcher 122, one or more views of the user's fingerprint(s) are stored in the template storage 110 during the enrollment process of the application suite 120. In order to facilitate matching, the one or more views of the user's fingerprint(s) are stored in a way that facilitates matching with fingerprint views captured during the authentication process. In this regard, the location and orientation of minutia and/or ridge curvature and/or ridge density are stored in the template storage 110.

Figure 4A:
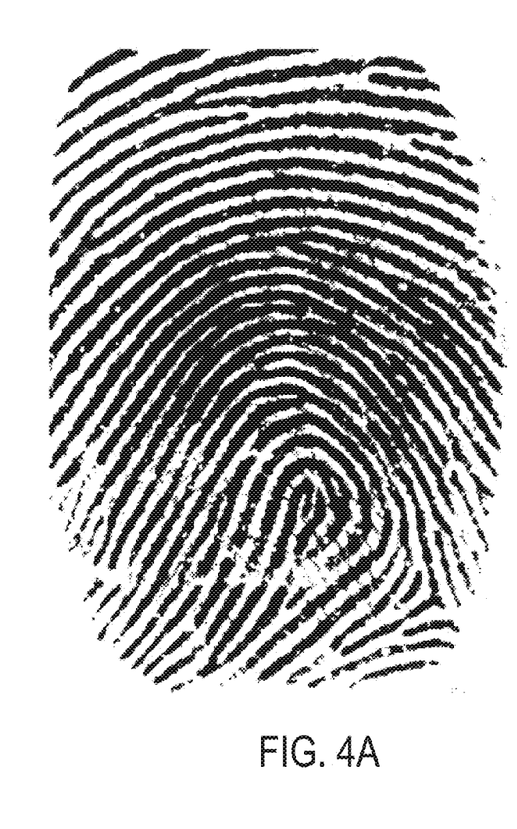
FIG. 4a is an image of a fingerprint.
Figure 4B:
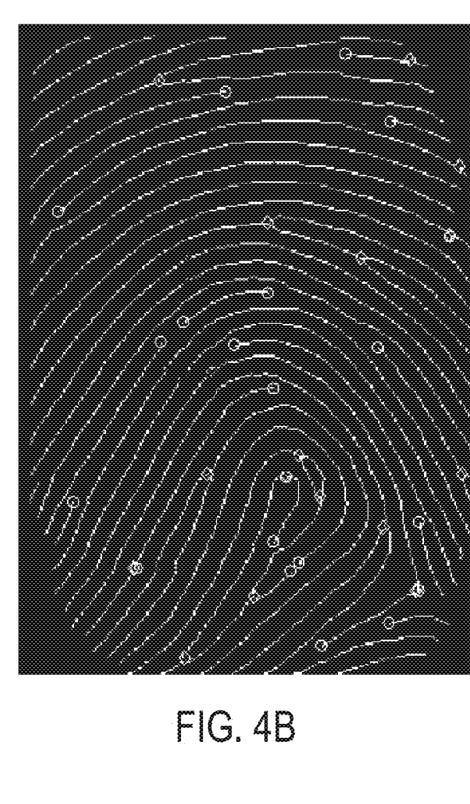

FIG. 4A depicts an example of a grayscale fingerprint image as captured from a sensor. FIG. 4B depicts a skeletonized (also referred to as "thin-ridge") representation of the fingerprint image in FIG. 4B. FIG. 4B also depicts minutia points overlaid on the skeletonized image. If minutia matching is used, feature extraction may involve conversion of the raw image to the skeletonized image, and derivation of the minutia points from the skeletonized image. In another minutia matching implementation, the minutia points can be extracted from a grayscale image. In a ridge matching implementation, the skeletonized image itself may be used as the features of interest, in which case matching can be performed based on the a difference metric, such as chamfer distance, between ridges in the images. In such a ridge matching implementation, as well as certain other pattern matching implementations, the location and orientation of the minutia points may not be needed for matching.

Additionally, in embodiments where the sensor 102 (see FIG. 1) is a partial placement sensor, due to the size of the sensing area of the sensor 102 typically being smaller than the user's fingerprint area, a multitude of placement images of the user's fingerprint from the placement sensor 102 may be collected to form the enrollment template such that it adequately describes the user's fingerprint. As the multitude of placement images are collected, the enroller function of the application suite 120 calls on the matcher 122 to relate the placement views with each other such that they can be grouped into an accurate composite of the user's fingerprint.

Relating the various placement views to one another requires localization of each placement view, which specifies a location within the user's fingerprint of an individual placement view. In certain embodiments, to assist in localization, the placement image is converted into an orientation representation, which specifies a directional orientation of each ridge of the placement image on a pixel by pixel basis, or at a lower resolution depending on the coarseness used. Essentially, each pixel in a ridge converted to the orientation representation is represented by data describing the orientation or direction of the ridge. As an aside, once converted to the orientation representation, the placement image may be referred to as an orientation map. Further, in certain embodiments, prior to converting to the orientation space, the placement image is converted to a thin ridge version of the placement image, and then the thin ridge image is converted to the orientation space. As additional placement images are collected and converted to an orientation space, the matcher 122 (see FIG. 1) will begin to localize each placement view based on ridges having a similar orientation.

Figure 5:
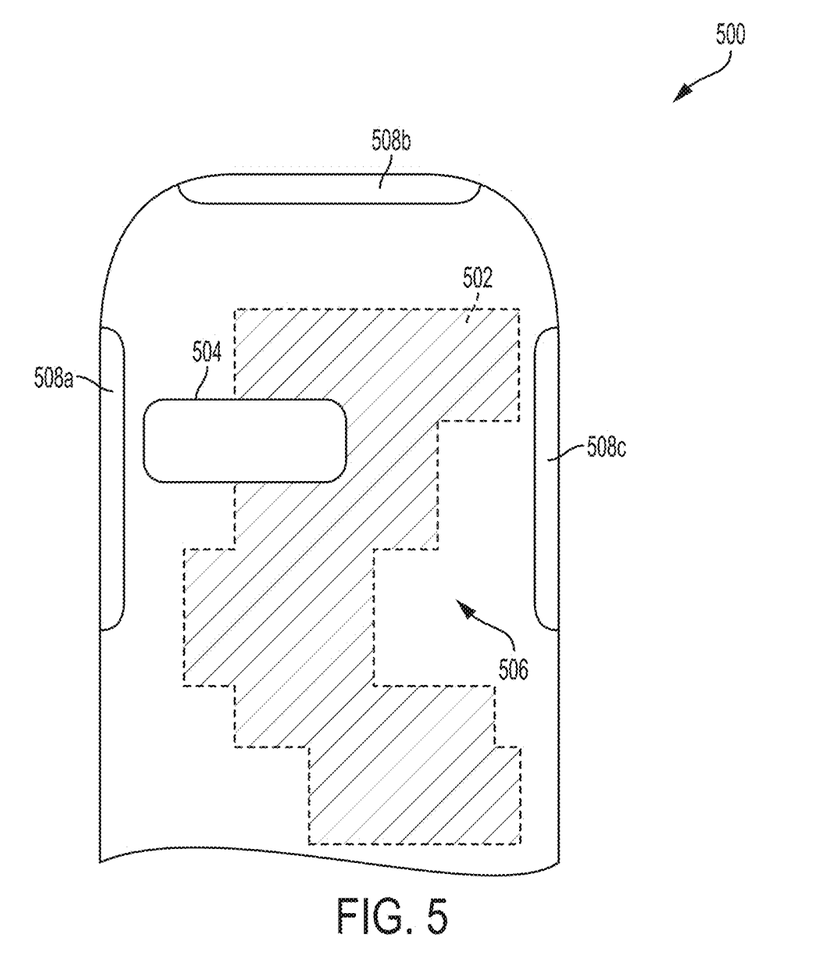
FIG. 5 is an illustration of a user's fingerprint, in accordance with an embodiment of the disclosure.

As these partial placement images are localized they are collected and stored as the enrollment template. FIG. 5 is an illustration of an exemplary embodiment of a user's fingerprint 500 showing a collection of localized placement views that form a portion 502 of the user's fingerprint 500. A recently collected placement view 504 is illustrated in relation to the portion 502. As described above, the placement view 504 will be localized in comparison to the portion 502 in order to determine how it fits along with the rest of portion 502. In the illustrated embodiment, placement view 504 overlaps with the portion 502 of the user's fingerprint already localized and collected into the enrollment template. However, in other embodiments, the placement view 504 may not overlap with the portion 502, or only have a small overlap resulting in a low confidence in the alignment, such that localizing the placement view 504 by comparing to previous localized portions of the fingerprint becomes more difficult. In addition, multiple disconnected views or clusters of views may result, and for which reliable alignment becomes difficult without a global reference for localization.

Further, as illustrated, a portion 506 of the user's fingerprint 500 has not been presented to the placement sensor 102 and therefore has not been collected for adding to the enrollment template. However, as the enroller of the application suite 120 and the matcher 122 do not have prior knowledge of the user's fingerprint 500, the portion 506 of the user's fingerprint that has not been collected is an unknown. Therefore, in situations where there is no overlap between the placement view 504 and the collected portion 502, it becomes difficult to locate where the placement view 504 should be located in the uncollected portion 506 in relation to the collected portion 502.

In one embodiment, localization may be aided by the use of a floor map based on a generalization as to a type of fingerprint pattern. Generally, each fingerprint can be classified into one of only a few types of fingerprint patterns based on the overall contour shapes. There are different possible classification schemes. In one scheme, fingerprints are generally classified as loops, whorls, or arches. In another scheme it is possible to classify these into a larger number of groups. The fingerprint patterns are classified based on rich ridge information areas in the fingerprint 500. Typically, rich ridge information will be found in the center (or "core") of the fingerprint 500. Generalized floor maps may be created that contain a generic pattern based on one of the previously mentioned patterns. The generalized floor map does not contain any actual information from the user's fingerprint but rather includes general information based only on one of the general types of fingerprints.

Therefore, if a placement image is obtained from the center of the user's fingerprint 500 it will contain rich ridge information that allows identification of one of these five patterns. If this occurs, then one of the generalized floor maps may be used to localize the placement image from the center of the user's fingerprint 500. Additional placement images can also be localized based on the placement image captured from the center of the user's fingerprint 500 and the generalized floor map.

In other embodiments, localization may be aided by use of a floor map of the user's fingerprint 500 obtained by swiping or rolling the user's fingerprint 500 over the sensing area of the sensor 102 (see FIG. 1). In this embodiment, the floor map is a view of the majority of the user's fingerprint 500 obtained by swiping or rolling the user's fingerprint one or more times over a sensing area of the sensor 102. The floor map of the user's fingerprint 500 essentially allows each placement image captured by the sensor 102 (see FIG. 1) to be localized based on the floor map. Accordingly, once a placement image is obtained it is compared to the floor map to be localized and then grouped with additional previously collected placement images for storage as part of the enrollment template. Or if the placement image is the first placement image collected during enrollment, this placement image is compared to the information (either minutia or pattern information) in the floor map in order to localize.

As described above, the floor map may be generated based on a swipe image collected by having the user swipe or roll his or her fingerprint across the sensing area of the sensor 102. Typically, the image captured from swiping or rolling the fingerprint over the sensing area of a placement sensor will be distorted in a manner that makes them difficult to be utilized as the enrollment template for a placement image in certain matching schemes. For example, distortions may cause the same portion of the fingerprint to look different if it is captured from a swipe of the finger over the sensor instead of a placement. If ridge matching or another matching scheme is used that involves accuracy down to the level of individual pixels, it may be difficult to reliably match a placement image to a corresponding swipe template. However, embodiments of this disclosure recognize that a resulting swipe image can be utilized as a floor map in localizing further obtained placement images. For example, by converting the captured image into an orientation representation or another smooth representation, and/or sampling the images at a lower resolution, a placement image may be reliably aligned to the swipe representation in order to obtain useful location information of a placement image. In certain embodiments, other representations may be used instead of the orientation map to coarsely localize the placement image, such as a smoothed thin ridge representation, an intensity map, curvature map, singularity, and the like.

Figure 6:
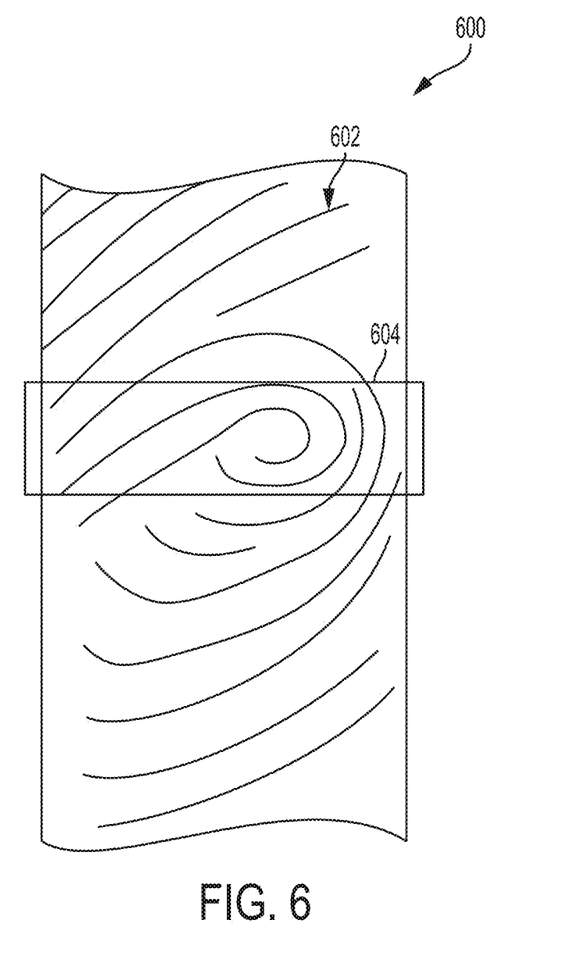
FIG. 6 is an illustration of a floor map, in accordance with an embodiment of the disclosure.

FIG. 6 illustrates floor map 600 generated by the user swiping the fingerprint 500 over a sensing area 604 of the sensor 102 (see FIG. 1). In the illustrated embodiment, the sensing area 604 is smaller than the area of the user's fingerprint 500. Therefore, when the fingerprint is placed on the sensing area 602, only a partial image of the user's fingerprint 500 is collected. However, when the user swipes the fingerprint 500 across the sensing area 604, a larger area of the fingerprint 500 will be captured in one continuous image, which may be reconstructed from a series of scans. In certain embodiments, this image is then utilized as the floor map 600. In some embodiments, ridges 602 of the floor map may be converted into the orientation space in order to be used to localize placement images also converted into the orientation space. Further, in certain embodiments, the ridges 602 of the floor map 600 may be converted to thin ridges (see FIG. 4b) prior to being converted into the orientation space.

Accordingly, when a placement image, such as the placement image 504 (see FIG. 5) is captured, it can be compared to the floor map 600 in order to localize the placement image 504 based on a comparison of representations of the placement image 504 and the floor map 600. As further additional placement images are collected, they can be localized in relation to the placement image 504 and the floor map 600.

In this regard, as the enrollment template is filled in with placement images, the floor map 600 can be utilized to determine what portion of the fingerprint 500 (see FIG. 5), such as portion 506, has not yet been captured by a collected placement image. The user can then be prompted on an output device 114 (see FIG. 1) such as a display of the electronic device 100 to place a specific portion of the fingerprint 500 over the sensor 102 in order to collect a placement image for the portion 506. Additionally, the display may also notify the user of an orientation of the fingerprint 500 relative to the sensing area 602 that the fingerprint 500 should be placed. In this manner, in certain embodiments, the user will be prompted to place portions of the fingerprint 500 at a specified orientation until enough placement images have been collected and localized in order to generate the enrollment template.

Alternatively, in certain embodiments, the floor map 600 itself could be utilized as an initial supersize enrollment template and any distortions in the floor map 600 could be filled in with placement images, as they are collected. In this manner, the floor map 600 will form the basis of the enrollment template until enough higher quality placement images 504 are collected to replace the floor map 600. In certain embodiments, the additional placement images can be collected over time, for instance during an extended enrollment process.

Returning briefly to FIG. 5, a left edge 508a, a top edge 508b and a right edge 508c of the user's fingerprint 500 is further illustrated. Typically, when capturing the floor map, the user will not be able to swipe at least one of the left edge 508a, top edge 508b or the right edge 508c with the swiping or rolling motion. Accordingly, in certain embodiments, the user may be prompted to place one or more of the left edge 508a, top edge 508b or the right edge 508c of the fingerprint 500 onto the sensing area 604 (see FIG. 6) of the sensor 102 (see FIG. 1), and once an image of one of the left edge 508a, top edge 508b or the right edge 508c is obtained it can then be added to the floor map 600 in order to help in localizing further placement images that may at least partially include a portion of one of the left edge 508a, top edge 508b or the right edge 508c of the fingerprint 500.

Additionally, in certain embodiments, the floor map 600 may be artificially extended by extending the tips of each ridge at the edge of the floor map. This extension is done by determining the orientation of the ridge at the edge of the floor map 600 and then extrapolating that outward from the edge. In this manner, the floor map 600 may be extended to provide further information to be utilized in localizing placement images in order to assist in generating the enrollment template.

Figure 7:
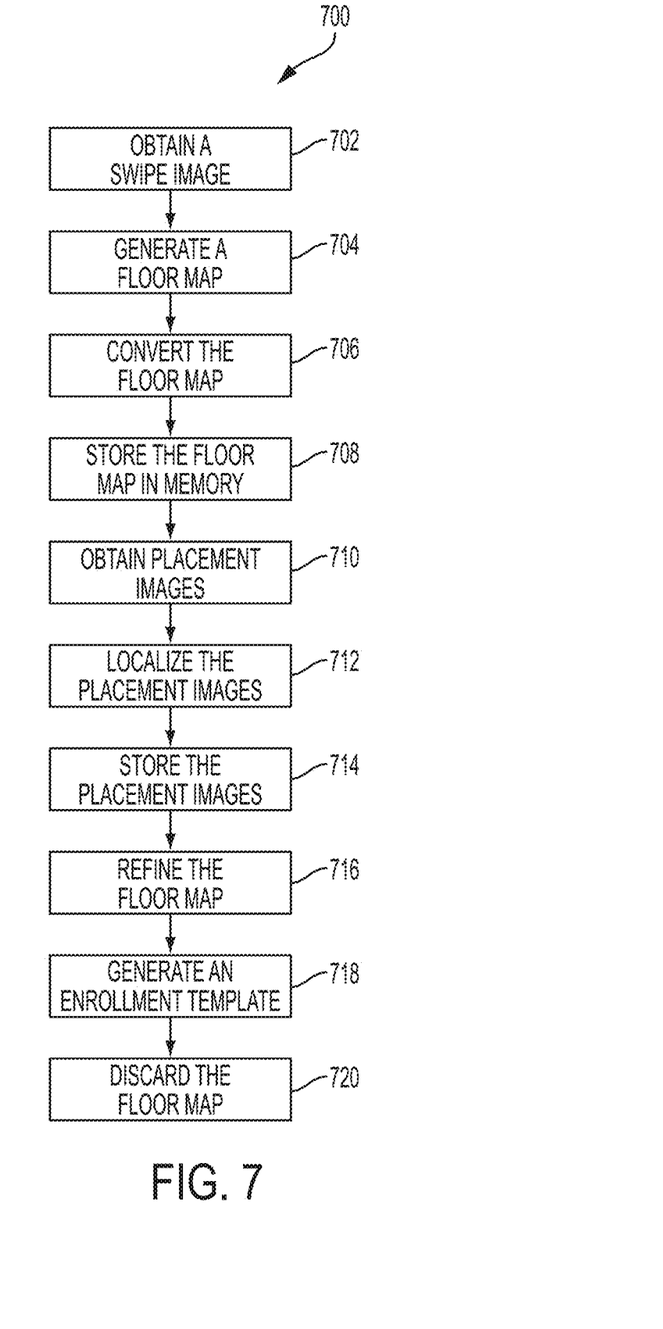
FIG. 7 is a flow chart illustrating a method for generating an enrollment template, in accordance with an embodiment of the disclosure.

FIG. 7 illustrates a flow chart 700 for generating an enrollment template by the electronic device 100 (see FIG. 1). At step 702, a swipe image 600 (see FIG. 6) of the user's fingerprint 500 (see FIG. 5) is obtained. The swipe image contains a larger area of the user's fingerprint 500 than would typically be captured by placing the fingerprint 500 onto the sensing area 604 of the sensor 102. In certain embodiments, after capturing the swipe image 600, at step 706, the processing system 104 will convert the swipe image 600 to the orientation space in order to develop an orientation map that encodes a ridge direction for each pixel included in the ridge. At step 708, the floor map 600 is stored in memory 108.

At step 710, placement images are captured by the user placing the fingerprint 500 (see FIG. 5) over the sensing area 604 (see FIG. 6) of the sensor 102 (see FIG. 1). In certain embodiments, the placement images are converted to the orientation space for comparison to a floor map 600 in the orientation space. While in other embodiments, neither the placement images nor the floor map 600 are converted to the orientation space. Either way, at step 712, the placement images are localized to the fingerprint 500 based on the floor map 600 and other previously collected placement images (if previously placement images have been obtained). At step 714, the localized placement images are stored in the memory 108. In certain embodiments, the localized placement images are stored in a different location in the memory 108 than the floor map 600.

In certain embodiments, flow chart 700 includes step 716 to refine the floor map 600 (see FIG. 6). In these embodiments, the distortions in the floor map 600 may be corrected using information from an obtained and localized placement image, or if a placement image from one of the left edge 508a, top edge 508b or the right edge 508c (see FIG. 5) is collected, and that image is not already included in the floor map 600, then the image can be added to the floor map 600 to improve localization of additional placement images collected from around one of the left edge 508a, top edge 508b or the right edge 508c of the fingerprint 500.

At step 718, the enrollment template is generated by grouping the obtained and localized placement images. In one embodiment, the localized placement images are grouped by compiling them into an enrollment graph, which specifies a geographical relation among neighboring views including alignment information describing an alignment between each neighboring view. Neighboring views are determined based on the localization step 712, which is performed based on the comparison to the floor map 600 (see FIG. 6). The geographical relation map may contain errors representing overlap between the localized placement views. However, these errors can be corrected using certain optimization techniques, such as a graph consistency optimization, in order to remove the errors caused by the overlap in the localized placement views. After the optimization, the localized placement views related by the enrollment graph will comprise the enrollment template and may be stored in the template storage 110. In one embodiment, rather than just storing the individual localized placement views related by the enrollment graph, the individual localized placement views may be stitched together using the alignment information from the geographical relation such that a single stitched image representing a composite of the localized and optimized placement views are stored in the template storage 110 as the enrollment template. Or in other embodiments, rather than a single stitched image, the localized placement images may be stored along with stitching information such that the placement images forming the enrollment template are able to be related such that a comparison can be done as though the images formed a single image without actually converting the enrollment template into a single image file.

In certain embodiments, once the placement images have been localized and the enrollment template generated at step 718, the floor map 600 (see FIG. 6) may be discarded, at step 720. However, in other embodiments, the floor map 600 may be stored in memory 108 or template storage 110 for later use.

Figure 8:
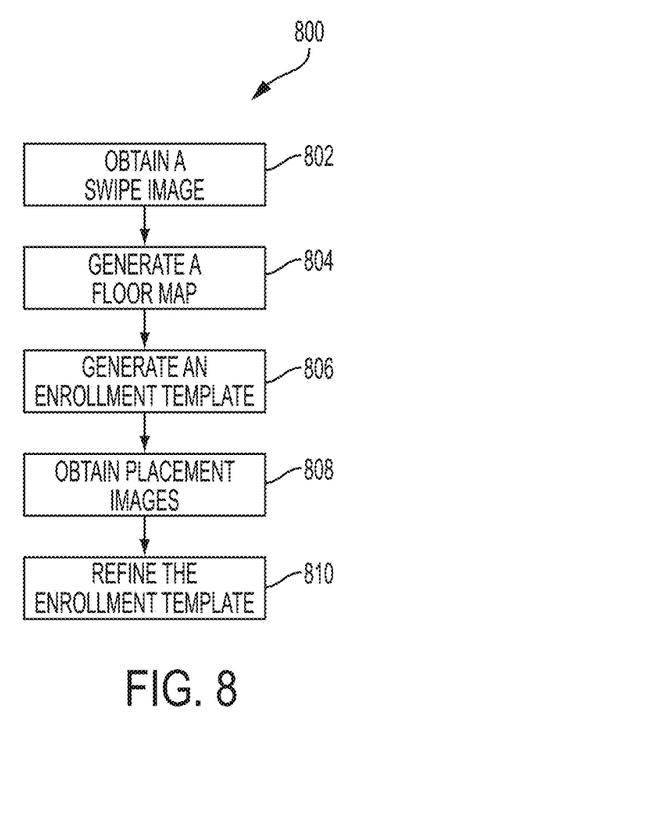
FIG. 8 is a flow chart illustrating a method for generating an enrollment template, in accordance with an embodiment of the disclosure.

FIG. 8 illustrates a flow chart 800 for generating an enrollment template based on the floor map 600 (see FIG. 6). At step 802, a swipe image is obtained by prompting the user to swipe the fingerprint 500 (see FIG. 5) over the sensing area 604 (see FIG. 6) of the sensor 102 (see FIG. 1). At step 804, a floor map 600 (see FIG. 6) is generated based on the swipe image. At step 806, the floor map 600 is stored in the template storage 110 and utilized as the enrollment template. At step 808, placement images are collected. In certain embodiments, the placement images are collected over time while the electronic device is in use such that the placement images are obtained as the user interacts with the sensor 102 (see FIG. 1) of the electronic device 100. As placement images are obtained, at step 810, the obtained placement images are localized to the floor map 600 and utilized to correct distortions in the floor map 600 such that the enrollment template is refined. As more placement images are obtained and localized, the enrollment template will be refined further.

Figure 9:
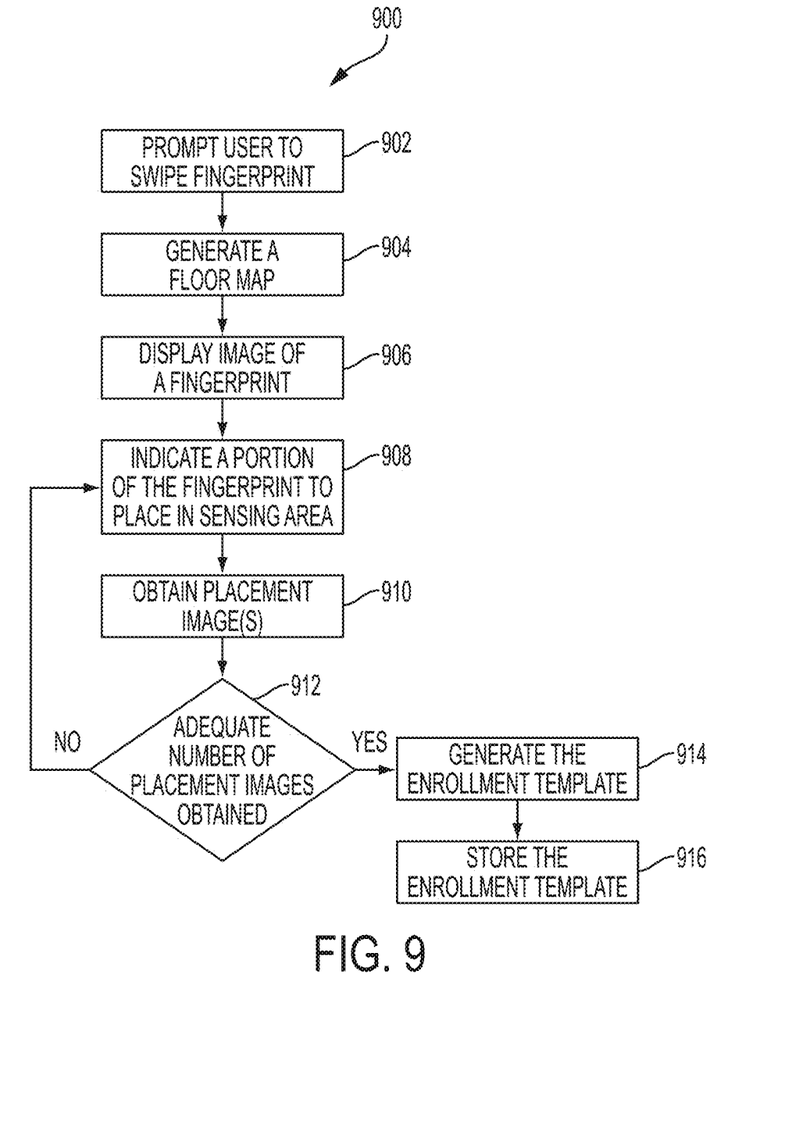
FIG. 9 is a flow chart illustrating a method for prompting a user to collect fingerprint images for generating an enrollment template, in accordance with an embodiment of the disclosure.

FIG. 9 illustrates a flow chart 900 for prompting a user to collect fingerprint images for generating an enrollment template. At step 902, an enrollment prompt is displayed on an output device 114 (see FIG. 1) such as a display that requests the user swipe the fingerprint 500 (see FIG. 5) across the sensing area 604 (see FIG. 6) of the sensor 102 in order to collect a swipe image of the fingerprint 500. At step 904, the processing system 104 proceeds to generate a floor map 600 based on the swiped image of the fingerprint 500. At step 906, the processing system 104 displays an image of the fingerprint 500 based on the floor map 600 on the display. At step 908, the processing system 104 indicates a portion of the fingerprint 500 and an alignment of the user's finger relative to the sensing area 604 such that the user should be able to place onto the sensing area 604 of the sensor 102 the requested portion of the fingerprint 500 at the requested alignment. Once the user places the portion of the fingerprint 500 at the requested alignment indicated at step 908 on the sensing area 604, a placement image is obtained at step 910.

At step 912, the processing system 104 (see FIG. 1) determines whether enough placement images have been obtained in order to form an adequate enrollment template. This is accomplished by localizing the obtained placement image based on the floor map 600 (see FIG. 6). After localizing the placement image, the processing system 104 determines what portions of the fingerprint 500 have not yet been obtained in placement images, and if portions of the fingerprint 500 still need to be obtained, then at step 908, the user is prompted to place a different portion of the fingerprint 500 onto the sensing area 604. Steps 908 through 912 repeat until the processing system 104 determines that enough of the fingerprint has been collected to generate the enrollment template at step 914. At step 916, the enrollment template is stored in the template storage 110.

The embodiments and examples set forth herein were presented in order to best explain the present disclosure and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device for generating an enrollment template, the input device comprising:
   a partial fingerprint sensor; and
   a processing system coupled to the partial fingerprint sensor, the processing system configured to:
      obtain a swipe image of a user's fingerprint, the swipe image being captured while the user's fingerprint is moved over a sensing area of the partial fingerprint sensor;
      generate a floor map of the user's fingerprint from the swipe image, the floor map being larger than the sensing area of the partial fingerprint sensor;
      obtain a placement image of the user's fingerprint, the placement image being captured while the user's fingerprint is held stationary over the sensing area of the partial fingerprint sensor; and
      localize the placement image of the user's fingerprint based on the floor map.

2. The input device of claim 1, wherein the processing system is further configured to convert the floor map into an orientation map.

3. The input device of claim 1, wherein the processing system is further configured to:
   obtain additional placement images of the user's fingerprint, the additional placement images being captured while the user's fingerprint is held stationary over the sensing area of the partial fingerprint sensor; and
   localize the additional placement images of the user's fingerprint based on the floor map.

4. The input device of claim 3, further comprising a memory, wherein the floor map, the placement image and the additional placement images are stored in the memory.

5. The input device of claim 4, wherein the floor map is stored in a different location in the memory from the placement image and the additional placement images.

6. The input device of claim 4, wherein the processing system is further configured to refine the floor map based on the placement image and the additional placements images.

7. The input device of claim 4, wherein the processing system is further configured to generate the enrollment template using the placement image and the additional placement images after the placement image and the additional placement images have been localized.

8. The input device of claim 7, wherein the floor map is discarded after generating the enrollment template.

9. The input device of claim 6, wherein a subset of the additional placement images include one or more placement images from outside of an area of the user's fingerprint captured in the floor map; and
   wherein the one or more placement images are added to the floor map.

10. The input device of claim 1, further comprising a display, wherein the processing system is further configured to display a visual representation of the floor map to the user to guide placement of the user's fingerprint.

11. A method of constructing an enrollment template containing images obtained from a partial fingerprint sensor of an input device, the method comprising:
obtaining a swipe image of a user's fingerprint, the swipe image being captured while the user's fingerprint is moved over a sensing area of the partial fingerprint sensor;
generating a floor map of the user's fingerprint from the swipe image, the floor map being larger than the sensing area of the partial fingerprint sensor;
obtaining a placement image of the user's fingerprint, the placement image being captured while the user's fingerprint is held stationary over the sensing area of the partial fingerprint sensor; and
localizing the placement image of the user's fingerprint based on the floor map.

12. The method of claim 11, further comprising converting the floor map into an orientation map.

13. The method of claim 11, further comprising:
obtaining additional placement images of the user's fingerprint, the additional placement images being captured while the user's fingerprint is held stationary over the sensing area of the partial fingerprint sensor; and
localizing the additional placement images of the user's fingerprint based on the floor map.

14. The method of claim 13, further comprising storing the floor map, the placement image and the additional placement images in a memory of the input device.

15. The method of claim 14, wherein the floor map is stored in a different location in the memory from the placement image and the additional placement images.

16. The input device of claim 14, further comprising refining the floor map based on the placement image and the additional placements images.

17. The input device of claim 14, further comprising generating the enrollment template using the placement image and the additional placement images after the placement image and the additional placement images have been localized.

18. The input device of claim 17, further comprising discarding the floor map after generating the enrollment template.

19. The input device of claim 16, wherein a subset of the additional placement images include one or more placement images from outside of an area of the user's fingerprint captured in the floor map; and
wherein the one or more placement images are added to the floor map.

20. An electronic system for constructing an enrollment template containing images obtained from a partial fingerprint sensor of the electronic system, the electronic system comprising:
a processing system configured to:
obtain a swipe image of a user's fingerprint, the swipe image being captured while the user's fingerprint is moved over a sensing area of the partial fingerprint sensor;
generate a floor map of the user's fingerprint from the swipe image, the floor map being larger than the sensing area of the partial fingerprint sensor;
obtain a placement image of the user's fingerprint, the placement image being captured while the user's fingerprint is held stationary over the sensing area of the partial fingerprint sensor; and
localize the placement image of the user's fingerprint based on the floor map.

21. The input device of claim 1, wherein the processing system is further configured to store the placement image in enrollment template storage.

22. The input device of claim 1, wherein the processing system is further configured to utilize the floor map as an initial enrollment template, and obtain the placement image during an extended enrollment process.

23. The input device of claim 1, wherein the partial fingerprint sensor is a placement sensor configured to operate in a swipe mode.

* * * * *